(12) United States Patent
Kageler

(10) Patent No.: US 9,643,138 B2
(45) Date of Patent: May 9, 2017

(54) METHOD AND APPARATUS FOR MIXING, TRANSPORTING, STORING, AND TRANSFERRING THIXOTROPIC FLUIDS IN ONE CONTAINER

(75) Inventor: Paul Kageler, Lake Jackson, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 949 days.

(21) Appl. No.: 13/416,767

(22) Filed: Mar. 9, 2012

(65) Prior Publication Data

US 2013/0233393 A1 Sep. 12, 2013

(51) Int. Cl.
*B01F 7/16* (2006.01)
*B01F 7/00* (2006.01)
*B01F 15/00* (2006.01)
*E21B 21/01* (2006.01)

(52) U.S. Cl.
CPC ............ *B01F 7/1695* (2013.01); *B01F 7/002* (2013.01); *B01F 15/00681* (2013.01); *E21B 21/01* (2013.01); *Y10T 137/0324* (2015.04); *Y10T 137/8376* (2015.04)

(58) Field of Classification Search
CPC ....................................................... F17D 3/00
USPC ......................................... 366/348, 279–284
See application file for complete search history.

(56) References Cited

U.S. PATENT DOCUMENTS

| 1,120,534 | A | * | 12/1914 | Pruden ................... B01F 5/0453 110/104 R |
| 2,469,649 | A | | 5/1949 | Wood et al. |
| 4,091,463 | A | | 5/1978 | Tschudy et al. |
| 4,148,101 | A | | 4/1979 | Einhorn |
| 4,185,923 | A | * | 1/1980 | Bouette et al. ................. 366/10 |
| 4,385,999 | A | * | 5/1983 | McCrary ................ C09K 8/145 175/72 |
| 4,422,770 | A | * | 12/1983 | Geible ................ B01F 7/00325 366/248 |
| 4,594,883 | A | * | 6/1986 | Pollard ............ B01F 15/00201 73/54.23 |
| 4,606,648 | A | | 8/1986 | Coyle et al. |
| 4,813,786 | A | | 3/1989 | Lemaster |
| 5,055,180 | A | | 10/1991 | Klaila |
| 5,203,574 | A | | 4/1993 | Stolzenfeld |
| 5,538,342 | A | | 7/1996 | Aoshima |

(Continued)

FOREIGN PATENT DOCUMENTS

| DE | 9216123 U1 | 4/1993 |
| DE | 202008010171 U1 | 10/2008 |
| KR | 10-2010-0019884 A | 2/2010 |

OTHER PUBLICATIONS

International Search Report and Written Opinion, International Application No. PCT/US2013/028236, 18 pgs., Sep. 2, 2013.

(Continued)

*Primary Examiner* — Abbas Rashid
(74) *Attorney, Agent, or Firm* — Tenley Krueger; Baker Botts L.L.P.

(57) ABSTRACT

A method for mixing, transporting, storing, and transferring a thixotropic fluid is disclosed. The method includes mixing a thixotropic fluid. The thixotropic fluid may be built within a fluid container that includes an agitation unit. Once it has gelled, the thixotropic fluid can be sheared using the agitation unit, which may be mounted within the fluid container. The thixotropic fluid can then be pumped out of the fluid container.

12 Claims, 3 Drawing Sheets

(56) References Cited

U.S. PATENT DOCUMENTS

| | | | | |
|---|---|---|---|---|
| 5,676,463 | A | * | 10/1997 | Larsen ................. B01F 7/1695 366/251 |
| 6,063,737 | A | * | 5/2000 | Haberman et al. ........... 507/261 |
| 6,336,739 | B1 | | 1/2002 | Lee |
| 7,614,451 | B2 | * | 11/2009 | Blaschke et al. ............. 166/285 |
| 2004/0228209 | A1 | | 11/2004 | Bielozer |
| 2005/0105388 | A1 | | 5/2005 | Fischman et al. |
| 2010/0102463 | A1 | | 4/2010 | Arnet |
| 2010/0319921 | A1 | | 12/2010 | Eia et al. |

OTHER PUBLICATIONS

International Search Report and Written Opinion issued in related PCT Application No. PCT/US2014/035140, mailed Sep. 24, 2014 (12 pages).

International Preliminary Report on Patentability issued in related PCT application No. PCT/US2014/035140, mailed Nov. 19, 2015 (9 pages).

International Preliminary Report on Patentability issued in related PCT application No. PCT/US2013/028236, mailed Sep. 18, 2014 (13 pages).

Office Action issued in related Canadian Application No. 2,906,225, mailed Aug. 11, 2016 (6 pages).

\* cited by examiner

METHOD AND APPARATUS FOR MIXING, TRANSPORTING, STORING, AND TRANSFERRING THIXOTROPIC FLUIDS IN ONE CONTAINER

BACKGROUND

The present disclosure relates generally to subterranean drilling and production operations and, more particularly, the present disclosure relates to a method and apparatus for mixing, transporting, storing, and transferring thixotropic fluids in one container.

Subterranean drilling and production operations typically utilize a variety of types of fluids, including thixotropic fluids. These thixotropic fluids may include many of the thixotropic spacers, sweeps, barrier pills, and fluid Loss Control Material (LCM) pills, which form gels under static conditions that must be broken by shearing before discharging. Accordingly, these thixotropic fluids are difficult to transfer out of transport containers commonly used for short term storage because it is difficult to prime transfer pumps when the thixotropic fluid is in a gelled state. Thixotropic fluids that are suspending solids such as barite or calcium carbonate weighing agents are particularly difficult to store and then discharge due to the gradual settling of the high density solids during storage. These settled solids may plug fluid discharge ports. To avoid problems associated with storing and transferring thixotropic fluids, the fluids are frequently built on site and quickly pumped downhole, without allowing time for the fluids to gel. Unfortunately, this practice can tie up rig personnel and rig pits during critical drilling operations, resulting in extra rig time, poor quality control, and/or the cost of renting additional blending and pumping equipment.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to subterranean drilling and production operations and, more particularly, the present disclosure relates to a method and apparatus for mixing, transporting, storing, and transferring thixotropic fluids in one container.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

The present disclosure is directed to an apparatus for mixing, transporting, storing, and transferring thixotropic fluid. The apparatus may include a fluid container that is certified to transport and store fluid chemical compositions used in drilling operations, including a variety of thixotropic fluids. In certain embodiments, the fluid container may be certified as a pressure vessel. The fluid container may include a first opening through which components of a fluid chemical composition or a fluid chemical composition may be added. The opening may be sealed using a lid that is removably engagable with the fluid vessel. An agitation unit may be mounted within the fluid container. In certain embodiments, the agitation unit may be contained within the fluid container once the first opening is sealed with the lid. This may eliminate the need for the re-certification of existing container and may further facilitate the certification of new containers.

Figure 1:
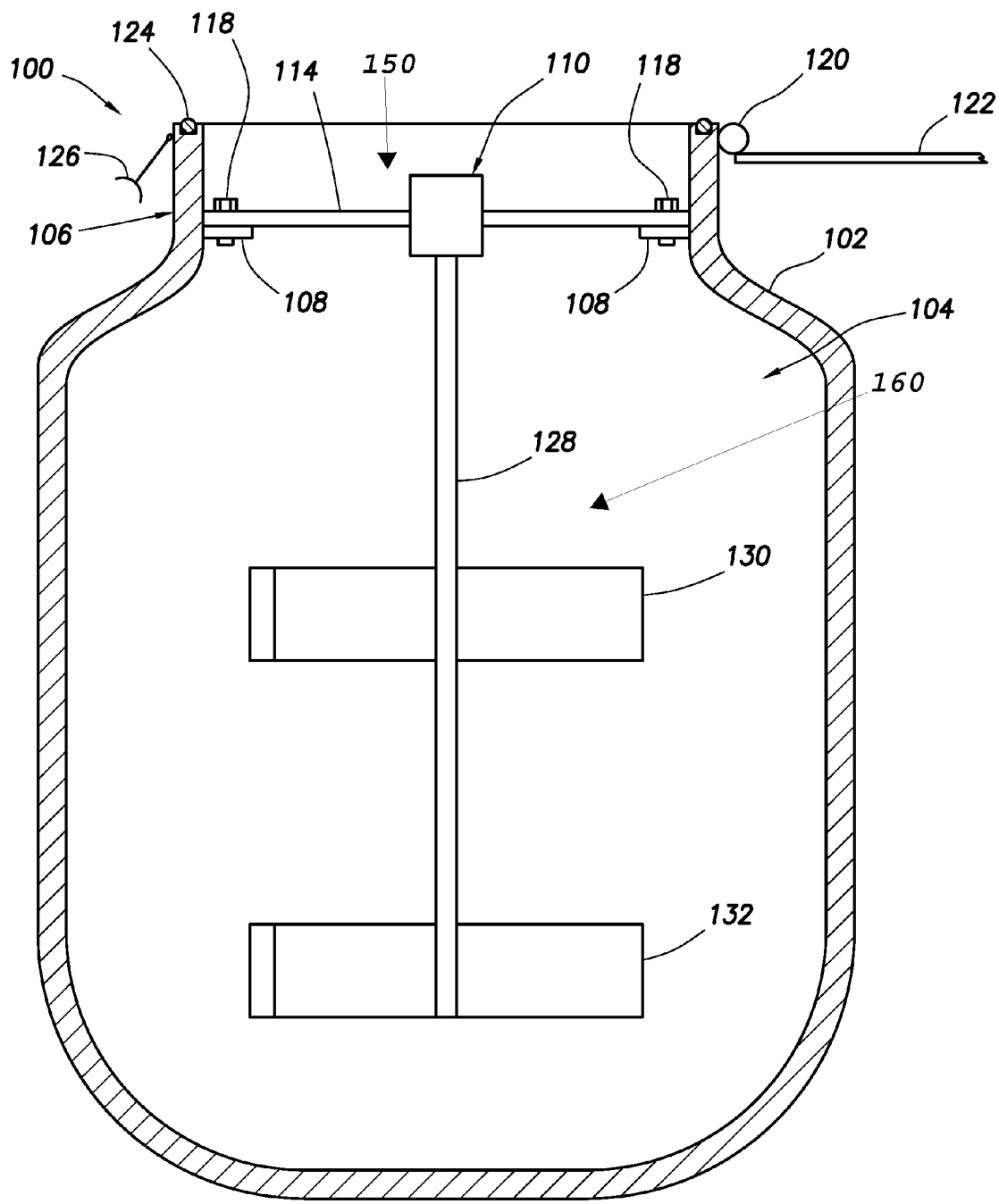
FIG. 1 illustrates an apparatus, incorporating aspects of the present disclosure.

FIG. 1 shows an example apparatus 100 according to aspects of the present disclosure. The apparatus 100 includes an example fluid container 102. The fluid container 102 may, for example, be certified to transport and store drilling fluids for downhole operations. In certain embodiments, the fluid container may, for example, be certified as a Intermediate Bulk Container (IBC) according to United Nations standards. The fluid container 102 may further be certified as a pressure vessel or another type of vessel according to standards instituted by a variety of standard setting organizations, as would be appreciated by one of ordinary skill in view of this disclosure.

The fluid container 102 may be made of, for example, hard plastic, metal, or another sufficiently robust material as would be appreciated by one of ordinary skill in view of this disclosure. The fluid container 102 may be generally cylindrical, and may define an inner chamber 104. The inner chamber 104 may be accessible through at least one opening 150 in the fluid container. In certain embodiments, thixotropic fluids located in the fluid container 102 may be pumped out of the fluid container 102 through the first opening 150. In other embodiments, an additional pump connection and opening may be incorporated into the fluid container. In the embodiment shown in FIG. 1, the fluid container 102 includes an elongated neck, or port 106, which extends from a top portion of the fluid container 102.

The apparatus 100 may further include a lid 122 that is removably engagable with the fluid container 102, such that it seals the inner chamber 104 when it is engaged. The lid 122 may be designed to meet desired operating pressure specifications. In the embodiment shown, the lid 122 is coupled to the fluid container 102 via a hinge 120 on the port 106 of the fluid container 102. When closed, the lid 122 may engage with seal 124 disposed on a top surface of the port 106. The lid 122 may be secured in place via wingnuts spaced around the port 106, such as wingnut 126. Although the lid 122 is shown attached to the fluid container 102 via a hinge 120 and secured with wingnut 126, other embodiments are possible. For example, in certain embodiments, the lid 122 may engage with fluid container 102 through a threaded connection.

In certain embodiments, the apparatus 100 may include a variety of other connections and features, which are not included in FIG. 1 for the sake of clarity. For example, the apparatus 100 may include a protective transport cage surrounding the fluid container 102. The apparatus may also include safe access systems for work above grade, pressure relief devices, and internal visual fluid level indicator. In certain embodiments, the apparatus 100 may also include fork truck lift slots and crane lift eyes to facilitate the transportation and storage of the fluid container 102, as will be described below. In certain embodiments, the apparatus 100 may also include fluid circulation lines, and mixing baffles. The particular configuration of the apparatus 100 may depend on the intended use of the apparatus 100 including the location where the apparatus 100 will be used, such as an offshore drilling rig.

The apparatus 100 may further include an agitation unit 160 mounted within the fluid container 102. The agitation unit 160 may include a collar 110, a shaft 128, and blades 130 and 132. The blades 130 and 132 may comprise a variety of configurations. For example, the number of blades can be varied, as can the location of the blade along the shaft 128. In certain embodiments, for example, the blades 130 and 132 may resemble propeller blades, angled to increase the shearing efficiency. Additionally, the blades 130 and 132 may have a length that is less that the diameter of the opening 150, to allow for an assembled agitation unit 160 to be inserted into the fluid container 102 during manufacturing.

The agitation unit 160 may be mounted to the fluid container 102 on brackets 108 integral with the fluid container 102. In the embodiment shown in FIG. 1, the agitation unit 160 is mounted to the fluid container 102 via bridge mount 114, brackets 108, and bolts 118. The agitation unit 160 may be coupled to the bridge mount 114, such that when mounted within the fluid container 102, the agitation unit 160 is restrained from moving vertically in the fluid container 102. Other mounting elements are possible as would be appreciated by one of ordinary skill in view of this disclosure. In certain embodiments, as can be seen in FIG. 1, the brackets 108 may be located in the port 106 of the fluid container 102. The collar 110 may include an interface to coupled with an agitator driver, as will be discussed below with respect to FIG. 2.

Figure 2:
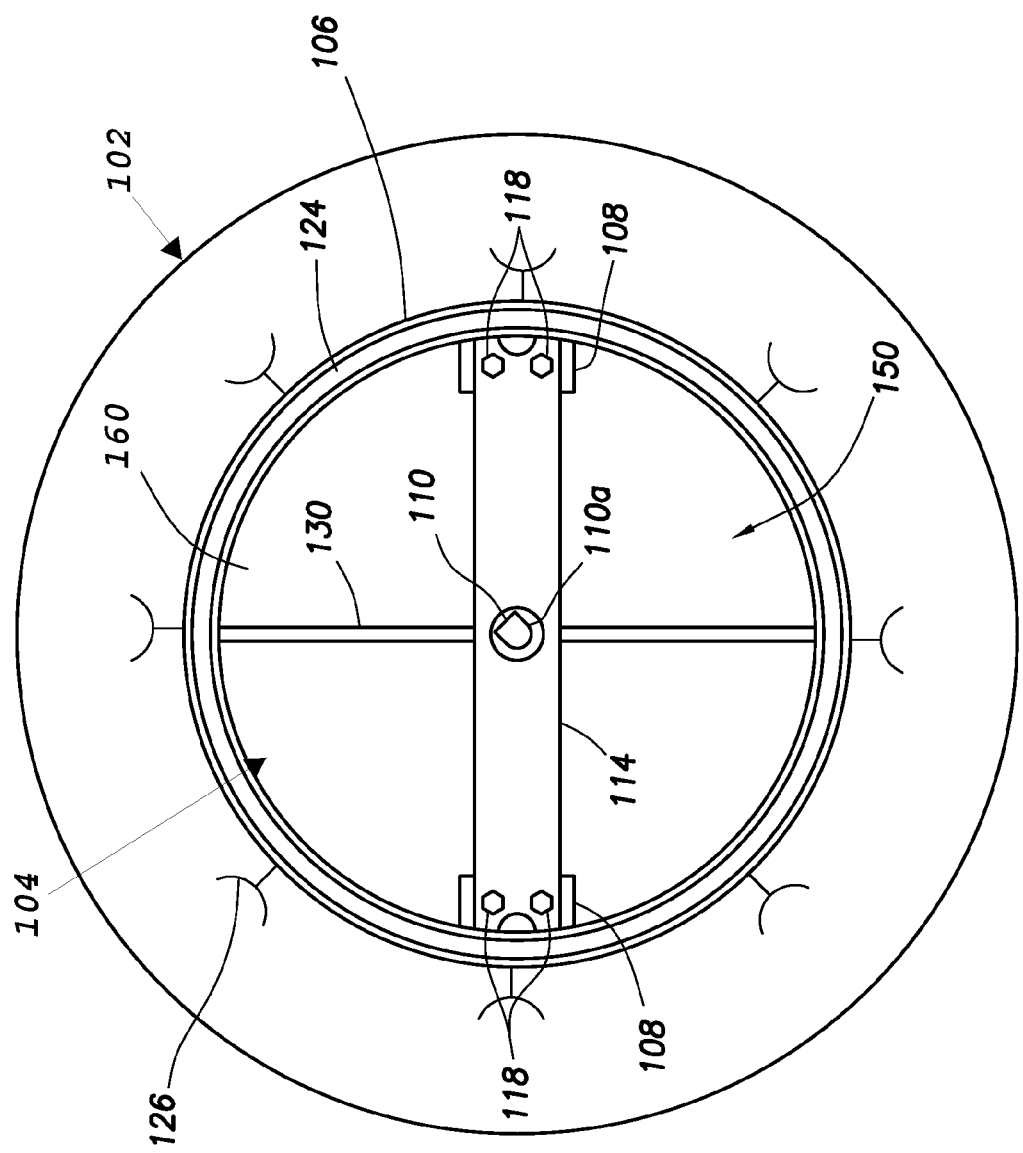
FIG. 2 illustrates an example apparatus, according to aspects of the present disclosure.

FIG. 2 illustrates a top view of the fluid container 102 shown in FIG. 1, without lid 122. As can be seen, the opening 150 through port 106 provides access to the inner chamber 104 of the fluid container 102. Notably, the bridge mount 114 substantially spans the diameter of the port 106, but does not fill the opening. Rather, the inner chamber 104 is accessible through the opening 150 on either side of the bridge mount 114. In certain embodiments, a device for holding sack(s) of solid additives (not shown) during addition to the fluid container 102 may or may not be included in opening 150. The embodiment shown may be advantageous because it provides access to the inner chamber 104, allowing fluids and solids to be added into the fluid container 102 for mixing, while still providing an integral agitation unit 160 to mix a drilling fluid, or shear a previously mixed thixotropic fluid once the thixotropic fluid has set. Additionally, the agitation unit 160 may be left in the fluid container 102 and not inserted and removed during the mixing and shearing processes, decreasing the time and cost to manufacture and use certain drilling fluids.

As mentioned previously, the agitation unit 160 may be coupled to an agitation drive using collar 110 to mix or shear fluids within the fluid container 102. In certain embodiments, the agitation drive may include a motor (not shown) which can be attached to the agitation unit, and cause the blades of agitation unit 160 to spin within the fluid containers. In certain embodiments, the agitation drive may include a hydraulic, a pneumatic, or an electric motor, which may have variable speed capabilities. In the embodiment shown in FIG. 2, the collar 110 includes an interface 110a to facilitate coupling with the agitation drive. The interface 110 may include a recess within the collar 110 that corresponds to a drive bit coupled to the agitation drive. Other coupling configurations between the agitation unit 160 and an agitation drive would be appreciated by one of ordinary skill in view of this disclosure.

Figure 3:
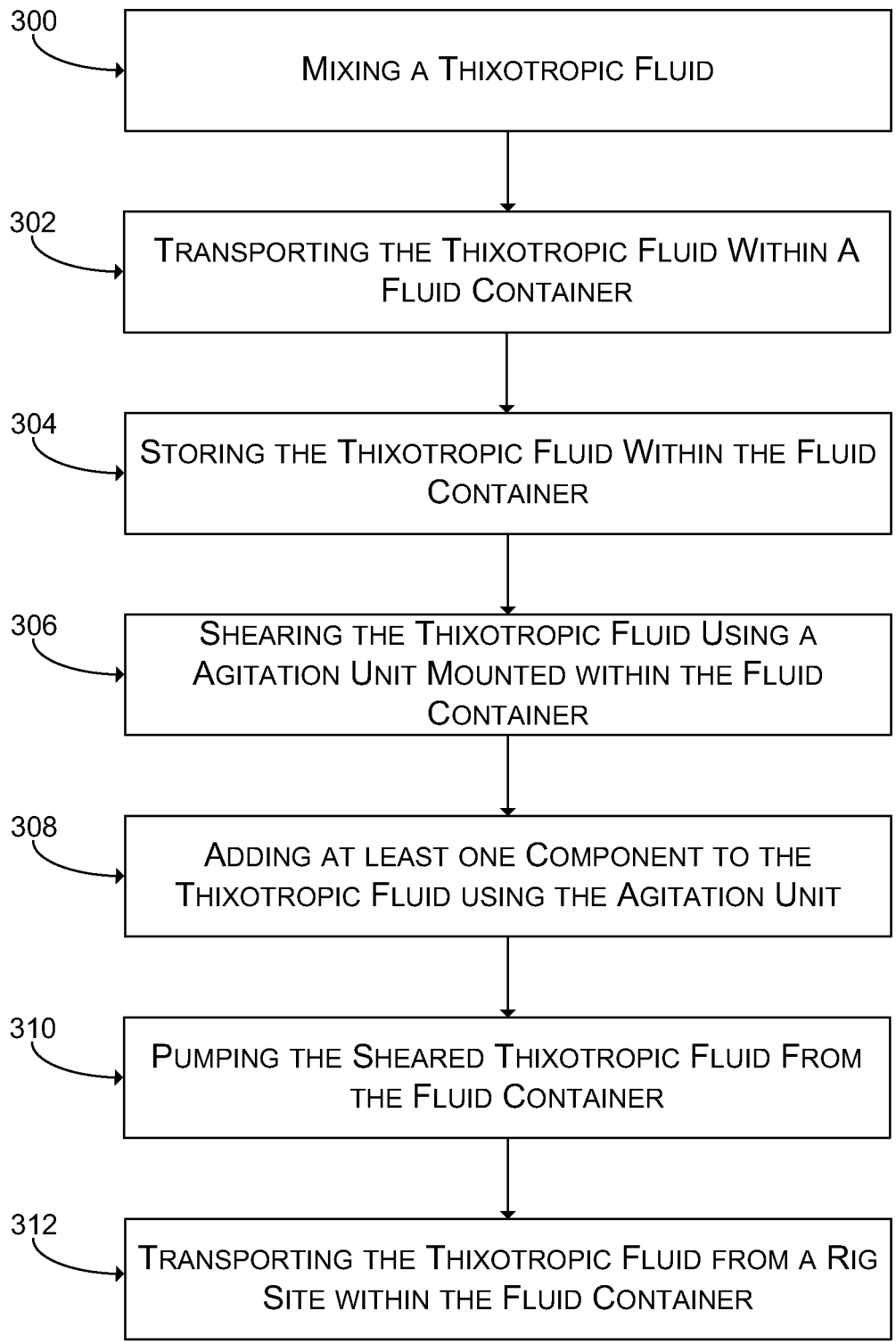
FIG. 3 illustrates an example method according to aspects of the present disclosure.

The apparatus 100 shown in FIGS. 1 and 2 may be advantageous because it provides a safe and cost effective way to mix, transport, store, and transfer thixotropic fluids to and from a drilling rig site. FIG. 3 illustrates the steps of an example method, according to aspects of the present disclosure. Step 300 includes mixing the thixotropic fluid. In certain embodiments, the thixotropic fluid may be built within a fluid container similar to the fluid container 102 shown in FIG. 1., or the thixotropic fluid may be built at a mixing plant using tank agitator, shear hoppers, recirculation pumps, barite silos, instrumentation, etc. In the embodiments where the thixotropic fluid is built at a mixing plant, a fluid container similar to the fluid container 102 shown in FIG. 1. may be filled with the thixotropic fluid once it is built.

Step 302 comprises transporting the thixotropic fluid within the fluid container similar to the fluid container 102 shown in FIG. 1. The fluid container 102 may be used to mix thixotropic fluid both at the rig site and at a remote locations. Where the thixotropic fluid is built at the rig site using the fluid container 102, the step of transporting the thixotropic fluid with the fluid container may be skipped. Where, however, the thixotropic fluid is built away from a rig site either within the fluid container 102 or at a mixing plant, the thixotropic fluid may be transported using the fluid container 102. In certain embodiments, the rate of blade rotation used to mix the materials within the fluid container can be optimized according to a specific application.

Step 304 includes storing the thixotropic fluid within the fluid container. As described above, a fluid container incorporating aspects of the present invention may include a sealable lid. In certain embodiments, the fluid container may be rated and certified to store potentially hazardous chemicals. Once a fluid container, such as fluid container 102, is transported to a rig site, the fluid container may be used to store previously built thixotropic fluids until such time as the fluids need to be used as part of the drilling process. Depending on the storage application, a lid coupled to the fluid container may or may not be closed.

Step 306 includes shearing the thixotropic fluid within the fluid container using an agitation unit mounted within the fluid container. A fluid container, such as fluid container 102, may be manufactured to include an agitation unit mounted within. The agitation unit may include, for example, blades that are at least partially disposed within the thixotropic fluids contained in the fluid container during static conditions. When it is time to use the thixotropic fluids at the rig site, the fluid container may be opened, and an agitation drive may be attached to the agitation unit. The agitation drive may cause the blade of the agitation unit to rotate, shearing the thixotropic fluid within the fluid container. Shearing the thixotropic fluid may decrease the viscosity of the thixotropic fluid, allowing it to flow more freely out of the fluid container. When coupled to a variable speed agitator drive, the agitation unit may begin at a lower rotational speed to minimize stress on the agitator unit, with the rotational speed increasing as the thixotropic fluid becomes less viscous.

Step 308 includes adding at least one component to the thixotropic fluid using the agitation unit. The characteristics of thixotropic fluid may be adjusted by adding components to the thixotropic fluid. In certain embodiments, the components may be added into the fluid container through an opening in the fluid container. The shearing action of the agitation unit within the fluid container may incorporate the component into the thixotropic fluid, thereby altering the characteristics of the thixotropic fluid for a particular application. Advantageously, because the fluid container includes the agitation unit, the steps of shearing and altering the characteristics of the thixotropic fluid can be accomplished simultaneously, saving time.

Step 310 comprises pumping the sheared thixotropic fluid from the fluid container. In certain embodiments, as described above with respect to FIG. 1, the thixotropic fluid may be pumped from the fluid container using an opening within the fluid container. In certain embodiments, the fluid container may include a dedicated opening with integrated attachment for coupling the fluid container to a pump.

Step 312 includes transporting the thixotropic fluid from a rig site within the fluid container. Given the propensity of thixotropic fluids to gel when transported, using a fluid container such as fluid container 102 to dispose of waste fluids may be advantageous. In certain embodiments, once the thixotropic fluid is circulated downhole, the fluid may be retrieved to the surface and must then be disposed of, typically at a designated location away from the rig site. Fluid container 102, for example, may be filled with waste fluids and then transported off site. Once at the disposal site, an agitation unit of the fluid container 102 can be used to shear the waste thixotropic fluid, reducing the viscosity of the waste fluid, and allowing it to flow more easily from the fluid container and into the disposal pit.

In one embodiment, the thixotropic fluid may include a weighted displacement spacer, and a fluid container, such as fluid container 102, can be used to mix, transport, store, and transfer the weighted displacement spacer. In certain embodiments, the weighted displacement spacer may be built at a mixing plant, as described above. The weighted displacement spacer can contain a weighing agent such as barite or calcium carbonate. The weighted displacement spacer may then be transferred into a fluid container with a 25 barrel capacity and transported to a rig site within the fluid container. Once at the rig site, the fluid container may be unloaded and stored until needed. When the weighted displacement spacer is needed, the lid of the fluid container may be opened, an agitator drive attached to the agitation unit, and the weighted displacement spacer sheared. Once sheared, the weighted displacement spacer may be pumped into a rig pit and then transferred downhole.

In another embodiment, the thixotropic fluid may include a barite spacer formula. Where the amount of barite required is such that the barite would settle during prolonged storage, a fluid container, such as fluid container 102 may be used to store the spacer formula and incorporate the barite at a later time. In certain embodiments, the spacer formula may be built at a mixing plant, as described above. The spacer formula may then be transferred into a fluid container with a 25 barrel capacity and transported to a rig site within the fluid container. Once at the rig site, the fluid container may be unloaded and stored until needed. When the spacer formula is needed, the lid of the fluid container may be opened, an agitator drive attached to the agitation unit, and the spacer formula sheared. While the spacer formula is being sheared, an additional component such as barite may be added. The agitation unit may incorporate the barite into the spacer formula. This may be advantageous because it avoids the problems associated with barite sag in drilling fluids, and the desired density of the spacer may not be known until just before pumping down hole, as would be appreciated by one of ordinary skill in the art in view of this disclosure. Once sheared, the spacer formula may be pumped into a rig pit and then transferred downhole.

In another embodiment, the thixotropic fluid may include a weighted viscose-based sweep for re-suspending and removing solids from the horizontal and vertical sections of a wellbore. A fluid container, such as fluid container 102, can be used to mix, transport, store, and transfer the weighted viscose-based sweep. In certain embodiments, the weighted displacement spacer may be built at a mixing plant, as described above. The weighted displacement spacer may then be transferred into a fluid container with a 15 barrel capacity and transported to a rig site within the fluid container. Once at the rig site, the fluid container may be unloaded and stored until needed. When the weighted viscose-based sweep is needed, the lid of the fluid container may be opened, an agitator drive attached to the agitation unit, and the weighted viscose-based sweep sheared. An onsite fluid engineer may determined a density needed for the sweep and calculate a quantity of an additional component, such as calcium carbonate, to add to the weighted viscose-based sweep. The calcium carbonate particle may be poured through an opening in the fluid container, and the agitation unit may incorporate the calcium carbonate particles within the weighted viscose-based sweep. The weighted viscose-based sweep may be pumped into a slug pit and then transferred downhole.

In another embodiment, the thixotropic fluid may include a weighted barrier fluid pill, and a fluid container, such as fluid container 102, can be used to mix, transport, store, and transfer the weighted barrier fluid pill. In certain embodiments, an empty 15 barrel capacity fluid container may be transported to a rig site. The weighted barrier fluid pill may then be built in the fluid container on site by at least, adding water into the fluid container, activating the agitation unit, adjusting the pH, adding a viscosifier that create a highly thixotropic fluid that gels under static condition, and adding barite particles to achieve a target density. The agitation unit of the fluid container may be stopped, and the weighted barrier fluid pill allowed to gel while stored within the fluid container. When the weighted barrier fluid pill is needed, the lid of the fluid container may be opened, an agitator drive attached to the agitation unit, and the weighted barrier fluid pill sheared. Once sheared, the weighted barrier fluid pill may be pumped into a slug pit and then transferred downhole.

In another embodiment, the thixotropic fluid may include a lost circulation material (LCM) pill that includes gelled particles suspended in a thixotropic fluid. A fluid container, such as fluid container 102, can be used to mix, transport, store, and transfer the LCM pill. In certain embodiments, an empty 15 barrel capacity fluid container may be transported to an off-shore jack-up rig. In the event of fluid loss to the formation, the fluid container 102 may be positioned such that the LCM pill, once built can be pumped to the cement unit of the jack-up rig using, for example, a three-inch diameter diaphragm pump and flexible hoses. When the LCM pill is needed, the lid of the fluid container may be opened, an agitator drive attached to the agitation unit, and the agitator drive engaged, causing the agitation unit to spin. Brine may then be added into the fluid container as a carrier fluid, followed by gelled LCM particles. The agitation unit may break up the agglomerated gelled particles, distributing the particles within the brine carrier fluid. The LCM pill may then be pumped into a cement unit.

In another embodiment, the thixotropic fluid may include waste thixotropic fluid that has already been circulated downhole. The waste thixotropic fluid may be located in an agitated rig slop pit at the rig site, and the waste thixotropic fluid must be transported to an off-site disposal facility. The waste thixotropic fluid may be transferred to a fluid container, such as fluid container 102, which may be used to transport the waste thixotropic fluid. Once at the disposal site, the agitation unit may be engaged to shear the waste thixotropic fluid and transfer the waste thixotropic fluid out of the fluid container.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for mixing, transporting, storing, and transferring a thixotropic fluid, comprising:
    mixing the thixotropic fluid, wherein the thixotropic fluid comprises a weighted viscose-based sweep;
    storing the thixotropic fluid within an inner chamber of a fluid container certified to transport and store thixotropic fluids for downhole operations and as a pressure vessel;
    shearing the thixotropic fluid, including the weighted viscose-based sweep, while it is within the fluid container by imparting rotation to an agitation unit at least partially disposed within the inner chamber of the fluid container, wherein the rotation is imparted through a collar of the agitation unit, wherein the collar is contained within the fluid container when a lid is engaged with the fluid container;
    varying a speed of the rotation based, at least in part, on a viscosity of the thixotropic fluid;
    adjusting a characteristic of the thixotropic fluid to form an adjusted thixotropic fluid, wherein adjusting the characteristic of the thixotropic fluid comprises at least:
        determining a density required for a sweep;
        calculating a quantity of an additional component; and
        incorporating the calculated quantity of the additional component into the thixotropic fluid;
    removing the sheared adjusted thixotropic fluid from the fluid container via an opening with integrated attachment, wherein the integrated attachment couples the fluid container to a pump; and
    pumping the sheared adjusted thixotropic fluid downhole.

2. The method of claim 1, wherein the thixotropic fluid is built at a first location.

3. The method of claim 2, further comprising steps of transporting the thixotropic fluid to a second location using the fluid container, and storing the thixotropic fluid within the fluid container at the second location.

4. The method of claim 3, wherein the thixotropic fluid comprises a weighted displacement spacer.

5. The method of claim 3, further comprising a step of adding at least one component to the thixotropic fluid within the fluid container using the agitation unit.

6. The method of claim 5, wherein the at least one component comprises barite, and wherein the barite is poured through a port in the fluid container.

7. The method of claim 5, wherein the at least one component comprises calcium carbonate, wherein the calcium carbonate is poured through a port in the fluid container, and wherein the calcium carbonate is added to vary the density of the thixotropic fluid.

8. The method of claim 1, wherein the thixotropic fluid is built within the fluid container at a rig site.

9. The method of claim 8, wherein the thixotropic fluid comprises a weighted barrier fluid, and wherein the step of mixing the thixotropic fluid comprises adding at least water, a viscosifier, and barite into the fluid container through a port of the fluid container at the rig site.

10. The method of claim 9, further comprising transporting the thixotropic fluid from the rig site using the fluid container.

11. A method for mixing, transporting, storing, and transferring a thixotropic fluid, comprising:
    providing a fluid container, wherein the fluid container:
        defines an inner chamber;
        includes a lid removably engagable with the fluid container;
        includes an agitation unit mounted within the fluid container, wherein the agitation unit includes a drive collar contained within the fluid container when the lid is engaged with the fluid container, and wherein the agitation unit comprises one or more blades that rotate at a variable speed; and
        is certified to transport and store a thixotropic fluid for downhole operations and as a pressure vessel, wherein the thixotropic fluid comprises a weighted viscose-based sweep;
    storing the thixotropic fluid in the inner chamber;
    shearing the thixotropic fluid using the agitation unit
    varying a speed of the rotation of the one or more blades based, at least in part, on a viscosity of the thixotropic fluid;
    adjusting a characteristic of the thixotropic fluid to form an adjusted thixotropic fluid, wherein adjusting the characteristic of the thixotropic fluid comprises at least:
        determining a density required for a sweep;
        calculating a quantity of an additional component; and
        incorporating the calculated quantity of the additional component into the thixotropic fluid;
    removing the sheared adjusted thixotropic fluid from the fluid container via an opening with integrated attachment, wherein the integrated attachment couples the fluid container to a pump; and pumping the sheared adjusted thixotropic fluid downhole.

12. The method of claim 11, further comprising a step of mixing the thixotropic fluid within the fluid container using the agitation unit, wherein the step of mixing includes adding at least one thixotropic fluid component into the inner chamber through an opening of the fluid container.

\* \* \* \* \*